Sept. 22, 1925.  E. H. SMYTHE  1,554,889
ANTIRATTLING GEAR
Filed Aug. 1, 1924
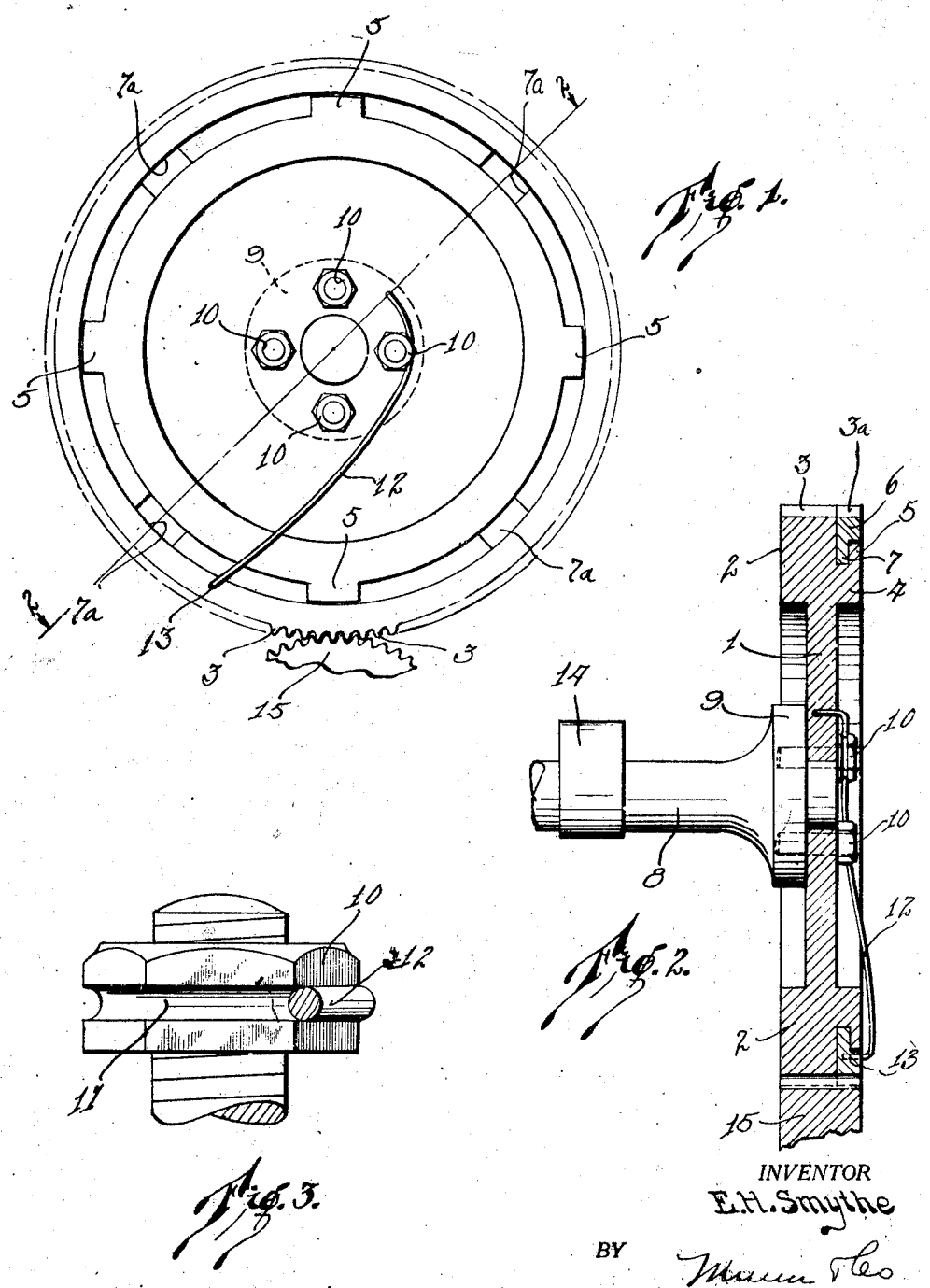
INVENTOR
E.H. Smythe
BY
ATTORNEYS Patented Sept. 22, 1925.

1,554,889

UNITED STATES PATENT OFFICE.

ETHELBERT H. SMYTHE, OF OTTUMWA, IOWA, ASSIGNOR OF ONE-HALF TO WILLIAM A. HUTSON, OF CHICAGO, ILLINOIS.

ANTIRATTLING GEAR.

Application filed August 1, 1924. Serial No. 729,609.

*To all whom it may concern:*

Be it known that I, ETHELBERT H. SMYTHE, a citizen of the United States, and a resident of Ottumwa, county of Wapello, and State of Iowa, have invented a new and useful Improvement in Antirattling Gears, of which the following is a full, clear, and exact description.

My invention relates to improvements in anti-rattling gears, and it consists in the combinations, constructions, and arrangements herein described and claimed.

In certain types of automobiles a great annoyance is caused by the constant rattling of gears, especially those which operate the cam shaft, due to the fact of back-lash. Various means have been used in an effort to overcome this annoyance. It has been proposed to employ gears made up of two parts, with spring means to hold the parts in such relation with the driving gear that the noise is eliminated. Some of these devices are difficult to assemble. Some are heavy, and some are expensive, because of the fact that they have to be cast or otherwise formed with openings or recesses to enclose springs of various kinds. An object of my invention is to provide a device of the type in which the cam shaft gear is composed of two parts, which are easily assembled. A further object of my invention is to provide a device of the type described, in which the recessing of the parts for permitting the use of springs is obviated.

A further object of my invention is to provide a device which is relatively light in weight, in comparison with its strength, and which is economical to build.

Other objects and advantages will appear in the following specification, and the novel features of the invention will be particularly pointed out in the appended claims.

My invention is illustrated in the accompanying drawings, forming part of this application, in which—

Figure 1 is a side view of a gear as assembled on a cam shaft,

Figure 2 is a section along the line 2—2 of Figure 1, and

Figure 3 is a detail view of one of the bolts.

In carrying out my invention, I provide a main body portion, consisting of a web 1 having an integral exterior rim portion 2, bearing teeth 3. The rim portion, as will be seen from Figure 2, has an annular extension 4 on one side, which extension bears lugs 5 that are spaced from the main body portion of the rim, as shown in Figure 2.

The auxiliary rim portion 6 is provided with a flange 7, which is adapted to enter between the lugs 5 and the body portion of the rim. The flange 7 has recesses $7^a$ corresponding in size and number with the lugs 5, which permit the auxiliary portion 6 to slip over the lugs so as to bring the flange 7 in close contact with the rim portion 2, when the auxiliary portion may be turned so as to bring the teeth $3^a$ of the auxiliary portion into registration with the teeth 3 of the rim portion 2. The web 1 is provided with an opening arranged to receive the end of a cam shaft 8. The latter may be provided with a fixed flange 9, against which the web 1 bears, and bolts 10 are provided by means of which the web may be securely fastened to the flange 9.

One of these bolts 10 is provided with a circumferential slot 11, as shown in Figure 3. A spring member 12 is connected at one end to the web 1, preferably by boring a hole through the web, and inserting the other end of the spring into the opening in the auxiliary portion of the gear, as shown at 13 in Figures 1 and 2. This spring member 12 passes around the grooved bolt head 10, as shown in Figures 1 and 2. The cam shaft bears the usual cam 14.

From the foregoing description of the various parts of the device, the operation thereof may be readily understood. In assembling the gear, the web 1 is secured to the flange by the bolts 10, and the auxiliary gear portion 6 is slipped over the lugs 5, and then turned to bring the teeth $3^a$ into substantial alinement with the teeth 3. The spring tension between the gear portions tends to take up any back-lash and render the operation of the gear substantially noiseless.

The gear portions may be instantly detached by rotating the auxiliary gear member 6 until the lugs are in registration with the openings $7^a$ in the member 6, whereupon the member 6 may be removed.

It will be seen by the form of this device, that the light auxiliary rim portion 6 may be acted on by a relatively light spring, and therein it differs from others of the type in which more than one spring is provided. Furthermore, the necessity of machining or casting recesses or openings in the parts to house the spring is obviated. The parts are light, and being simple in construction, do not easily get out of order.

One advantage of this device is that the tension on the spring 12 may be increased or decreased by turning the auxiliary gear portion 6 either forwardly or backwardly prior to bringing the gear 15 into mesh with the anti-rattling gear. After the gears have been brought into mesh, the tension on the spring will remain constant.

I claim:

1. An anti-rattling gear comprising a main body portion having an annular laterally extending portion provided with lugs spaced from said body portion, an auxiliary gear portion having an annular flange arranged to bear on said lateral extension and having openings arranged to receive the lugs, and spring means for causing rotation of one of said portions with respect to the other.

2. An anti-rattling gear comprising a main body portion having a web arranged to be secured to a shaft, and a rim portion provided with gear teeth, said rim portion having an integral annular lateral extension provided with lugs spaced from and parallel with the sides of said rim portion, an annular auxiliary gear portion having teeth on its periphery arranged to register with the teeth on said first named gear portion, and a flange arranged to enter between said lugs and said first named gear portion, said auxiliary gear portion being provided with openings for receiving said lugs, and spring means for causing relative movement between said gear portions.

3. The combination with a shaft having a flange, of an anti-rattling gear provided with a web, bolts holding said web to said flange, a rim integral with said web and having gear teeth thereon, an annular extension on one side of said rim, lugs carried by said annular extension, an auxiliary gear portion having a flange arranged to enter between the lugs and said first named gear portion, and being provided with teeth arranged to register with the teeth on said first named gear portion, and a spring secured to said web and arranged to pass around one of said bolts and being secured at its other end to said auxiliary gear portion, whereby relative rotative movement of one of said gear portions with respect to the other is effected.

ETHELBERT H. SMYTHE.